(12) United States Patent
Wirsam et al.

(10) Patent No.: US 8,655,477 B2
(45) Date of Patent: Feb. 18, 2014

(54) METHOD AND DEVICE FOR CUTTING OF RAW GLASS SLABS

(75) Inventors: Bernd Wirsam, Linden (DE); Renate Albat, Linden (DE)

(73) Assignee: Albat + Wirsam Software AG, Linden (DE)

( * ) Notice: Subject to any disclaimer, the term of this patent is extended or adjusted under 35 U.S.C. 154(b) by 948 days.

(21) Appl. No.: 12/377,449

(22) PCT Filed: Aug. 13, 2007

(86) PCT No.: PCT/EP2007/058358
§ 371 (c)(1),
(2), (4) Date: May 18, 2009

(87) PCT Pub. No.: WO2008/020005
PCT Pub. Date: Feb. 21, 2008

(65) Prior Publication Data
US 2010/0070066 A1 Mar. 18, 2010

(30) Foreign Application Priority Data
Aug. 17, 2006 (EP) .................................... 06119062

(51) Int. Cl.
*G06F 19/00* (2011.01)
(52) U.S. Cl.
USPC .............. 700/157; 700/28; 700/112; 700/117
(58) Field of Classification Search
USPC .............. 700/28, 97–98, 106–107, 112–117, 700/157, 159–160, 213–218
See application file for complete search history.

(56) References Cited

U.S. PATENT DOCUMENTS

| 3,490,320 | A | * | 1/1970 | Couvreur et al. | ................. 83/39 |
| 4,709,483 | A | | 12/1987 | Hembree et al. | |
| 4,965,983 | A | * | 10/1990 | Muller et al. | .................. 53/435 |
| 5,757,647 | A | * | 5/1998 | DeMichele | ..................... 700/95 |
| 7,167,767 | B2 | * | 1/2007 | Clayton et al. | ................ 700/100 |
| 2003/0226433 | A1 | | 12/2003 | Passant | |

FOREIGN PATENT DOCUMENTS

| CH | 626596 A5 | 11/1981 |
| EP | 0048334 A1 | 3/1982 |
| EP | 1284229 A2 | 2/2003 |
| EP | 1319634 A2 | 6/2003 |

(Continued)

OTHER PUBLICATIONS

English abstract and bibliographic information for CH626596, published Nov. 30, 1981, Applicant: Bystronic Masch.

(Continued)

*Primary Examiner* — Carlos Ortiz Rodriguez
(74) *Attorney, Agent, or Firm* — Marger, Johnson & McCollom P.C.

(57) ABSTRACT

Methods for cutting of raw glass slabs into a number of glass cuttings include determining the supply of uncut or partially cut raw glass slabs, continuously detecting incoming cutting orders, continuously processing of the cutting orders, continuously determining an optimized processing order and optimized cutting patterns of raw glass slabs based on determined values, processing cutting orders according to the determined optimized processing order and optimized cutting patterns, and storing the glass cuttings in assigned compartments of an intermediate storage. An increased productivity with minimized waste of material can be achieved by the continuous optimizing method in regards to the temporal sequence and cutting patterns of the glass cuttings.

27 Claims, 5 Drawing Sheets (56) References Cited

FOREIGN PATENT DOCUMENTS

| EP | 1431215 A1 | | 6/2004 |
|---|---|---|---|
| JP | 63138412 A | * | 6/1988 |
| JP | 6166530 A | | 6/1994 |
| JP | 2003306338 A | | 10/2003 |
| WO | WO 96/22948 A1 | | 1/1996 |

OTHER PUBLICATIONS

English abstract and bibliographic information for EP0048334, published Mar. 31, 1982, Applicant: Bystronic Masch.

English abstract and bibliographic information for JP6166530 published Jun. 14, 1994 Applicant: Asahi Glass Co. Ltd.

English abstract and bibliographic information for EP1284229 published Feb. 19, 2003 Applicant: Hegla Fahrzeug U Maschb GmbH.

English abstract and bibliographic information for EP1319634 published Jun. 18, 2003 Applicant: Albat & Wirsam Software Vertri.

English abstract and bibliographic information for JP2003306338 published Oct. 28, 2003 Applicant: Kawasaki Heavy Ind. Ltd.

English abstract and bibliographic information for EP1431215 published Jun. 23, 2004 Applicant: Bystronic Masch.

* cited by examiner

METHOD AND DEVICE FOR CUTTING OF RAW GLASS SLABS

FIELD OF THE INVENTION

The invention relates to a method and a device for cutting raw glass slabs into a multiplicity of glass cuttings.

TECHNICAL BACKGROUND

Figure 1:
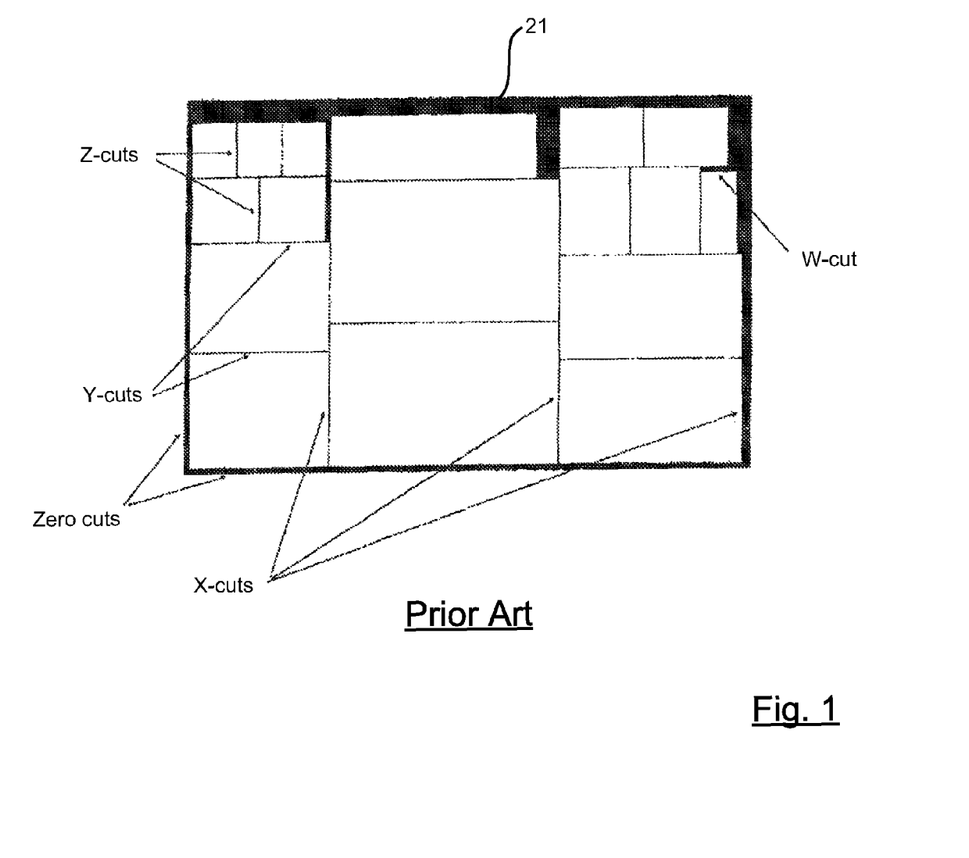
FIG. 1 shows in an exemplary manner a cutting pattern of a raw glass slab.

Since about 1976 the cutting of the fixed dimensions of frequently-used glass types has been based predominantly on so-called jumbo sizes (e.g. 6000×3210 mm). The raw product is delivered by HGV on large A-stands and deposited in packs on A-stands or L-stands in the glass plant by means of a gantry crane. From there the individual raw glass storage slab is tipped out of the pack using either the same gantry crane or other removal devices provided with vacuum suction elements and placed against the almost vertically-disposed vacuum suction elements of the tilting table. The suction elements are then tilted to the horizontal and thus also move the glass to the horizontal. New methods allow flat glass to be cut also in the vertical position. In the procedure usual up to now the glass is transported horizontally from the tilting table to the actual cutting table. There it is positioned roughly by lateral stops and finely in the longitudinal direction by sensors, and locked by being lowered on to the table. The cutting tables currently on the market have only one cutting head, which can be moved and positioned on a bridge. The bridge is also movable, so that each coordinate can be reached. The cutting head can be set to any desired angle. It is therefore possible to cut right-angled panes as well as rectilinear designs and completely free forms. The cutting plans are calculated on a computer (usually PC) by a cutting optimisation program and transferred to the machine control system via a network. As a rule, the computer of the machine control system is also able to carry out optimisations. A typical cutting plan for a raw glass slab 21 divided up in a characteristic manner is shown in FIG. 1.

The storage dimension first receives an initial cut in the transverse and longitudinal directions (zero cuts) which serve as reference straight lines. The cutting plan is then divided up briefly. The plan itself is first divided up transversely by x-cuts. The cross-cut strips thus produced are divided up again by y-cuts. Z-cuts may then be located between two y-cuts. So-called w-cuts may also occur theoretically, but generally do not lead to a further improvement in the proportion of cutting waste and therefore frequently are not generated at all in the cutting optimisation. The division described here has the advantage that automatic breaking can be carried out relatively simply.

The cut (better: notched) glass plate is transported onwards complete on to a series of breaking tables. The first breaking table has the function of breaking the x-cut. For this purpose the whole glass plate is either placed under tension on rollers, so that the x-cut is broken as it passes through, or it is broken by a breaking strip pressed against the glass from below. In this case, however, the glass must be briefly stopped in the correct position. The correct position is derived from the feed rate of the glass plate. In both methods, the panes are transported away at higher speed than the supply transport rate, so that a gap is produced between the cross-cut strips. On the last storage slab of an optimisation run a large residual plate is produced which must be removed from the flow via a further tilting table or manually, in some cases using a gantry crane. Another table diverts the glass flow away at a right angle. The breaking of the y-cuts is again carried out automatically, as described for the x-cuts, or manually. The glass flow is then again deflected through 90° and finally the z-cut is broken, again either automatically or manually. With individual designs the breaking is usually done manually.

After the breaking of the z-cuts the fixed dimensions are ready. They must then be moved back to the vertical, manually or automatically, and can then be sorted, either manually on fixed or movable A-stands, or automatically or manually in compartmented trucks. Fixed A-stands are then placed on mobile A-stands in the reverse sequence of production. The transport stands or compartmented trucks are supplied to the further processing operations (for example, insulating glass production, ESG production, grinding, drilling, etc.). At the processing lines the panes are unloaded manually or automatically. In the case of compartmented trucks it can be ensured that the removal sequence corresponds to an optimum production sequence of the following process.

EP 1 319 634 A1 describes a method and a device for dividing glass slabs into cuttings, the notched cross-cut strips being stored in an intermediate buffer and being supplied to a subsequent process as required. The structure of the intermediate buffer has the disadvantage that

- for example, an average volume of 400 square metres of single glass must be completely cut to size;
- a large amount of space is therefore required for storage;
- the glass must wait a long time for further processing (e.g. a half-day);
- a broken glass pane or a fast-tracked order in the following process can be cut only with a long time delay and outside the normal logistics.

The only methods by which, at present, glass can be divided up vertically in practice are used when dividing laminated safety glass, in particular bullet-proof glass. Laminated safety glass with two panes can be achieved by simultaneously notching the upper and lower panes. However, breaking of the panes does not separate them, because a film is still bonded between the two panes. The glass is finally severed by heating and pulling apart the panes and cutting the film with a blade. With more than two panes this method fails because the inner pane cannot be notched. Cutting must then be done by sawing or water jet. This takes place as a rule in the (almost) vertical position using a water-rinsed diamond cutting disc. By now, two-pane safety glass panels are also severed vertically at cutting plants. When processing the glass in the vertical position there is the added difficulty that the glass panels must be rotated. The patent application EP 0 905 062 A1 describes the method for cutting, breaking, severing the film and rotating the sheet.

Further patents and patent applications (U.S. Pat. No. 4,871,104, DE 42 34 536 A1, EP 0 805 784 B1) relate to cutting in the vertical position. They describe cutting and breaking in isolation, but not the continuous logistics of the glass production sequence. Moreover, the methods described in these documents have not yet been commercialised.

A further method for severing bullet-proof glass in the horizontal plane and also in the vertical plane, and of severing especially thick glass, operates with the water jet, whereby a water jet containing extremely fine glass dust under extreme pressure and at high velocity severs the glass.

US 2005/0182506 A1 describes a glass cutting line with which continuous optimisation of the glass cuttings takes place.

The present situation in insulating glass manufacture is characterised by the fact that standard insulating glass no longer consists, as earlier, of two identical panes of 4 mm float glass but, in more than 90% of cases, has an asymmetrical structure. Whereas earlier computer-aided optimisations of 4 mm float glass produced waste proportions of 5%, and therefore savings of 10% in comparison to manual dividing of the glass, today only approximately 15% of waste is achieved again, even when using conventional software. The reason is that, as a result of the asymmetrical structure of the panes, each type of glass must be optimised and temporarily stored individually. Because the available space is limited, and, moreover, the ability to react to market requirements makes it necessary constantly to feed new orders into the production process, the result is that it has been usual up to now to optimise, cut and produce many individual production jobs (7 to 8 for a plant of typical size) per day. The small volume which can be optimised in each case explains the poor utilisation of material, the high number of remnants at the end of each job and for each type of glass, the high handling requirement for putting aside the remnants and the risk of scratching by this handling.

SUMMARY OF THE INVENTION

It is therefore the object of the present invention to propose a method and a device for cutting raw glass slabs into a multiplicity of glass cuttings which makes possible a small proportion of waste even when processing a plurality of different types of glass.

This object is achieved by a method for cutting raw glass slabs into a multiplicity of glass cuttings comprising the steps of determining the supply of uncut and partially cut raw glass slabs, continuously detecting incoming new cutting orders and the processing of cutting orders, continuously determining an optimised processing sequence and optimised cutting patterns of raw glass slabs based on the determined values, processing the cutting orders according to the determined optimised processing sequence and optimised cutting patterns, storing and buffering the glass cuttings in dynamically assigned compartments of an intermediate storage unit in a manner controlled by a calculating device as a function of the optimised processing sequence determined, and sequenced removal of the glass cuttings from the intermediate storage unit, the compartments of the intermediate storage unit being charged with and emptied of glass cuttings simultaneously.

The endless method according to the invention can drastically lower the proportions of waste, considerably reduce the space requirement for sorting glass, sharply reduce transit times, react flexibly to obstructions, for example breakage and express orders, and greatly simplify handling of remnants.

The object is further achieved by a device for cutting raw glass slabs into a multiplicity of glass cuttings, comprising a raw glass slab storage unit for storing uncut and partially cut raw glass slabs, a detection device for detecting the supply of uncut and partially cut raw glass slabs and for continuously detecting incoming new cutting orders and processed cutting orders, a calculating device for continuously determining an optimised processing sequence and optimised cutting patterns of raw glass slabs based on the values determined by the detection device, a processing device for cutting the raw glass slabs into the glass cuttings, a control device for controlling the processing device according to the determined optimised processing sequence and the optimised cutting patterns, and a temporary storage unit with a plurality of compartments for the controlled dynamic storage and buffering of the processed glass cuttings as a function of the optimised processing sequence, the compartments of the intermediate storage unit being configured to be charged with and emptied of glass cuttings simultaneously.

In this device the optimised processing sequence may be determined on the basis of a further processing sequence required for subsequent further processing, or for dispatch of the glass cuttings.

The assigned compartment of the intermediate storage unit may be so selected that movement paths required for insertion and removal of the glass cuttings into and from the intermediate storage unit are minimised.

In the continuous determining of the optimised processing sequence and optimised cutting patterns of raw glass slabs, a plurality of different glass types, which can be processed in a freely selectable sequence, are preferably taken into account.

Individual glass panes fed in or removed manually, and also special express orders, may preferably be taken into account in the optimisation and processing control system.

According to a preferred exemplary embodiment, damage to a raw glass slab or to a glass cutting is detected during processing and taken into account in the continuous determination of the optimised processing sequence and optimised cutting patterns of raw glass slabs.

In the event of an interruption of processing, the instantaneous detection and determination results of the method are preferably stored automatically.

The determination of the optimised processing sequence and optimised cutting patterns of raw glass slabs may be set in favour of higher productivity in the form of glass cuttings processed per unit of time, or in favour of minimised wastage of material.

According to an exemplary embodiment, the compartments of the intermediate storage unit may be charged with and emptied of glass cuttings simultaneously.

The current processing status of the method, including any damage to raw glass slabs or glass cuttings, is preferably displayed on a display device in order to inform the operating team constantly about the current processing status.

BRIEF DESCRIPTION OF THE DRAWINGS

The invention is described in detail below with reference to exemplary embodiments and to the drawings, in which.

DETAILED DESCRIPTION OF THE INVENTION

Figure 2:
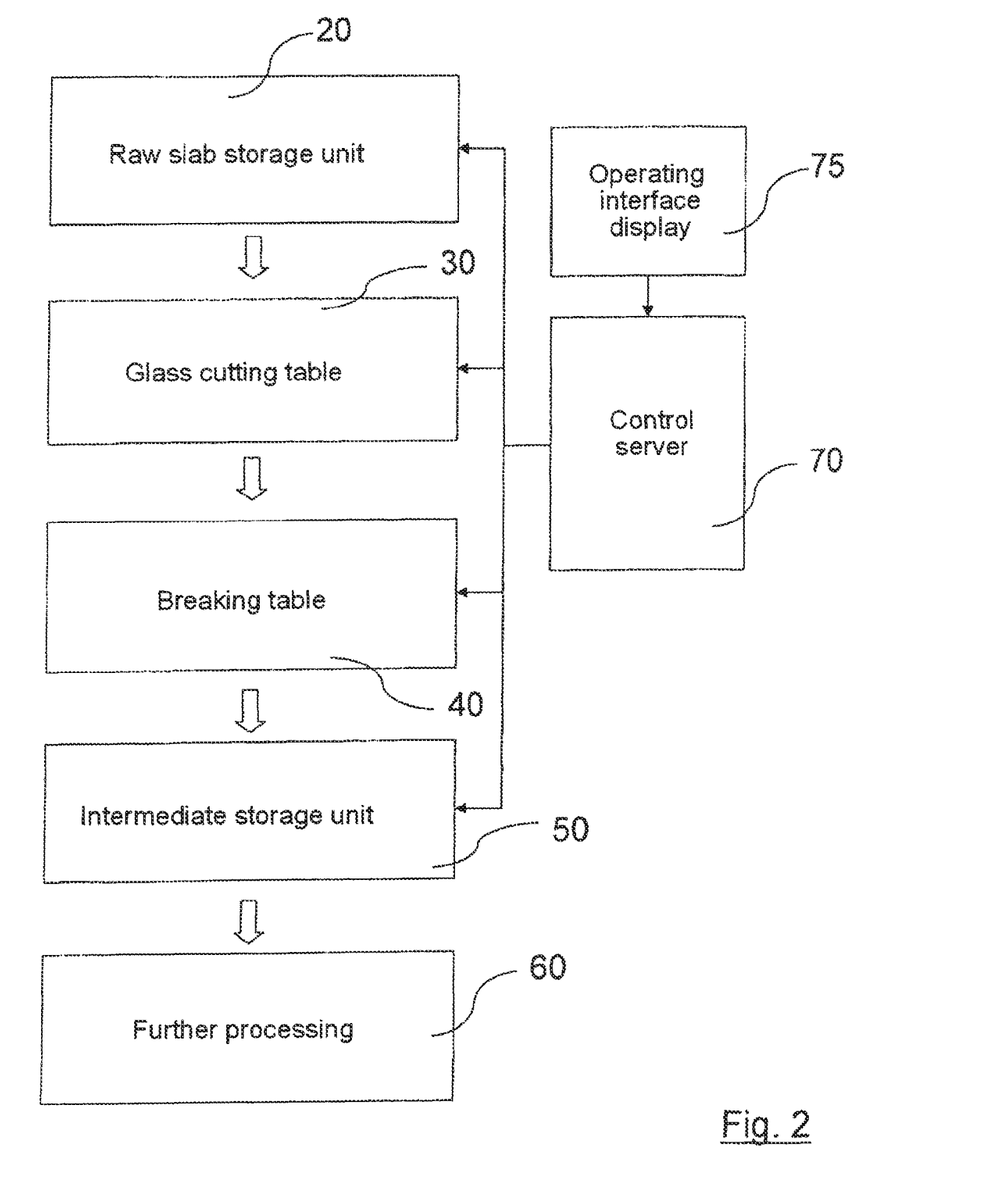
FIG. 2 shows schematically the essential components of an exemplary embodiment of the inventive glass cutting device.
Figure 3:
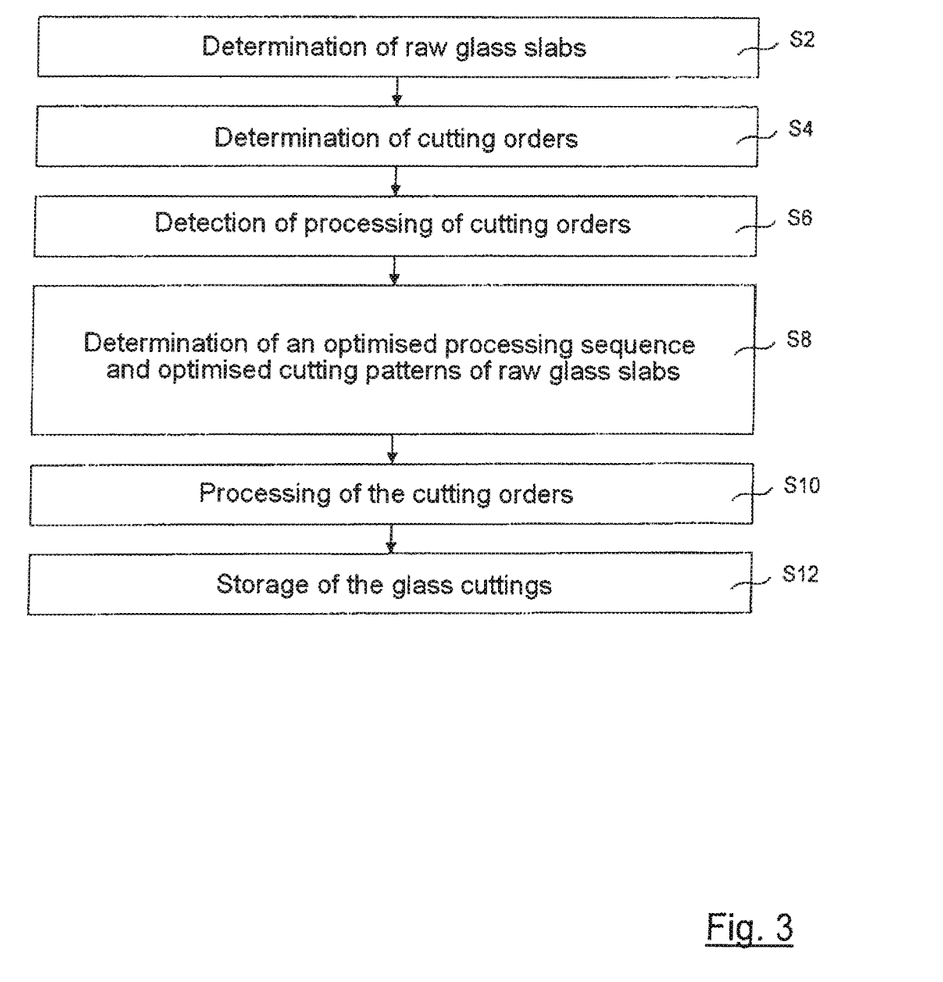
FIG. 3 is a flow diagram showing the process steps of an exemplary embodiment of the inventive glass cutting method.

FIG. 2 shows schematically the essential components of an exemplary embodiment of the glass cutting device according to the invention and FIG. 3 shows the process steps of the associated method according to the invention.

In a first process step S2 the uncut and partially cut raw glass slabs 21 located in the raw slab storage unit 20 are determined by the control server 70 in order to determine the stock of stored raw glass at the start of processing.

In process steps S4 and S6, which are both performed continuously, the control server 70 determines, on the one hand, newly incoming cutting orders and, on the other, cutting orders released for processing. On the basis of the data thus updated in each case, in process step S8 the control server 70 executes a continuous optimisation calculation of the cutting patterns and of the processing sequence of the total current existing orders, which generally include different types and thicknesses of glass. A processing sequence which is required or desired for the further processing on a subsequent processing line or for dispatch (for example, cutting the two associated glass panes of different thickness of an insulating glass pane in temporal proximity) may be input into the control server as a marginal condition, as well as especially urgent orders or individual orders fed in manually.

Figure 4:
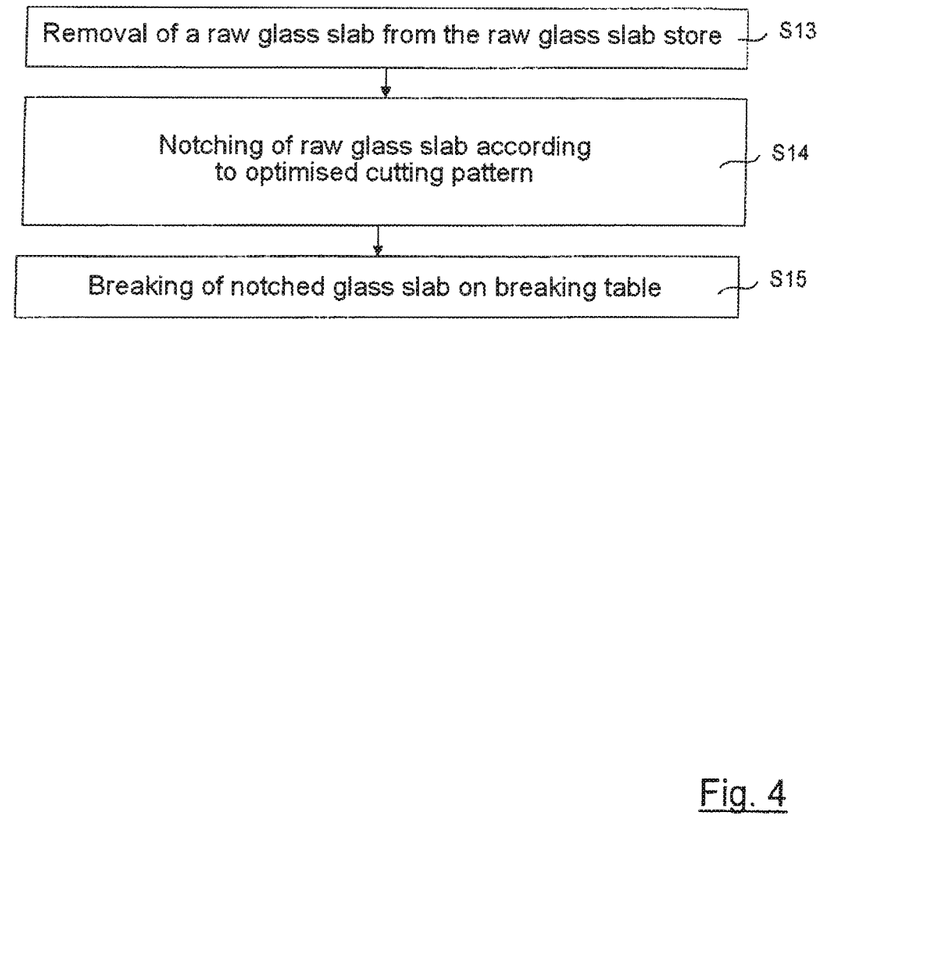
FIG. 4 is a flow diagram illustrating in more detail an exemplary embodiment of process step S10 of FIG. 3.

The cutting orders released by the control server 70 are then executed in process step S10 and the finished glass cutting is then temporarily stored in the designated compartment of the intermediate storage unit 50 (process step S12). As this happens, in a process step S13 (FIG. 4) the raw glass slab is moved by means of a gantry crane (not shown) or the like, while being controlled by the control server 70, from a raw glass storage unit 20 in which uncut and partially cut raw glass slabs are stored to the glass cutting table 30 on which the raw glass slab is notched (step S14) according to the cutting pattern determined by the optimisation calculation. On a breaking table 40, known per se, the notched slab is then broken in process step S15, in order to obtain the desired glass cutting which is then deposited in a designated compartment of the intermediate storage unit 50, preferably in a vertical position for space reasons. The glass cutting is then available for further processing on a processing line 60 or for dispatch.

An essential aspect of the method according to the invention is that, under the control of the control server 70, cutting of this stock of orders is not carried out to the end. Before the physical cutting reaches the above-mentioned problem zones towards the end of optimisation, a certain time has passed and new orders have been combined into production batches and released. The specialist workman, for example the cutter, can now—depending on the urgency—either insert the new production batches into the cutting process or attach them to the end of the existing process. In both cases a new task is produced for the cutting optimisation, which may include re-cutting of broken glass panes. The control server 70 recognises this situation and causes, as required, an appropriate re-optimisation of the panes which have not yet been sent to the cutting table 30. During the cutting process, therefore, a real-time optimisation takes place which continuously resolves the new tasks set. The problem zones are pushed ahead. The optimisation always draws, so to speak, from a plentiful supply and never comes to an end. This also applies to the end of the day, since the process can pause and be restarted the next morning where it was stopped the previous evening. The fact that the optimisation always has available enough glass panes to arrive at optimum cutting plans results in a utilisation of material which is significantly better than with limited optimisations. With optimisations which are (temporally) limited in volume, the utilisation rate generally declines towards the last cutting patterns. This effect is compensated by the combination of control server and optimisation, and the endless effect thereby made possible.

This happens because a central process monitors, controls and coordinates in real-time all the components involved. These components are: the display systems 75, the control of the cutting plant 30, 40, the control of a dynamic buffer (intermediate storage unit 50) and the continuous adaptation of the optimisation to the current situation. The optimisation thus obtains a simultaneous view of all types of glass and can optimise them simultaneously and in a coupled manner. Through making available the required glass quantities in temporal proximity and according to demand in this way, synchronisation of cutting is achieved. The optimisation always looks, so to speak, into several streams of panes of different types of glass which are to be made available.

The interaction of control server and optimisation is coordinated in such a way that the intermediate storage unit 50, which is located in the sequence after the cutting and breaking, can always be utilised optimally in relation to the requirements of the following processes. This produces a dynamic on two hierarchy-levels: on the direct control level up to the intermediate storage unit (sequencer), the parking places (compartments) in the sequencer are determined in such a manner that, depending on the machine technology, practically simultaneous insertion into and removal from the store is possible, whereby very short-term control can be implemented. On the logically higher level the panes (orders, express orders, re-cutting tasks) which are to be made available (optimised) are constantly observed and, if appropriate, the entire demand which has not yet been fixed (sent to the cutting line) is re-optimised. In addition, the optimisation is designed in such a manner that, depending on cost considerations, it can also favour simpler patterns which are somewhat inferior with regard to utilisation of material, in the interest of higher cutting productivity. As an overall result, this produces a method in which different aspects are held simultaneously in balance and in coordination, in a manner similar to a flow equilibrium which occurs frequently in nature.

The sequence resulting from this optimisation method then yields the following production steps when cutting glass: a simple vertical or horizontal glass cutting machine 30 is loaded from the raw slab storage unit 20. Either a whole slab is divided up, or only individual cross-cut strips (sub-slabs completely severed by a transverse cut). In this way, according to demand, a small quantity of required panes of one type of glass can be made available and, exactly as quickly, a small quantity of required panes of a second type of glass, some of which are needed to complete an insulating glass unit, for example. Given the asymmetrical structure of insulating glass panes now usual, two storage slabs or at least two cross-cut strips must therefore be completely severed in order to bring together a pane and its corresponding pane. That is to say that if a complete set can already be achieved with this procedure, a minimum buffer of approximately 40 square metres of glass (approximately 10 square metres of glass when using cross-cut strips) is needed. If—as is generally the case—the complete set cannot be achieved immediately, even more glass is required. This case of severing in terms of complete panels or cross-cut strips is implemented by a synchronised cutting optimisation.

The actual buffering is effected by a relatively small dynamic sequencer 50 in which the panes are arranged in order.

This sequencer 50 is used, inter alis, for short-term parking of panes which are not yet directly needed (are out of sequence with the order required in the following processes). In addition, panes which do not immediately enter the automated following process are extracted here. Furthermore, special panes (for example ESG, VSG or ornamental glass panes) can be fed into the following process here. What is important is that all this is monitored and controlled under real-time conditions by the control server 70. The control server is informed of the content of the sequencer at all times and determines directly and immediately the measures needed in the given situation, such as deciding the next input or output compartment, reacting directly to messages from the control system such as breakage or obstruction messages and, if appropriate, planning occupancy under the marginal condition of optimum throughput.

The intermediate storage unit or sequencer 50 may be implemented, for example, in that two magazines which are displaceable with respect to one another are dynamically charged with panes and simultaneously dynamically emptied. An alternative implementation of the sequencer 50 is represented schematically in FIG. 5 and consists of an immobile magazine having compartment 55 which can be charged from one side by means of a movable charging system 51 with handling means 53 for the glass cuttings 25 and, in a different sequence independent thereof, can be dynamically emptied on the same side or the other side by means of a corresponding removal device 52 with handling means 53.

Figure 5:
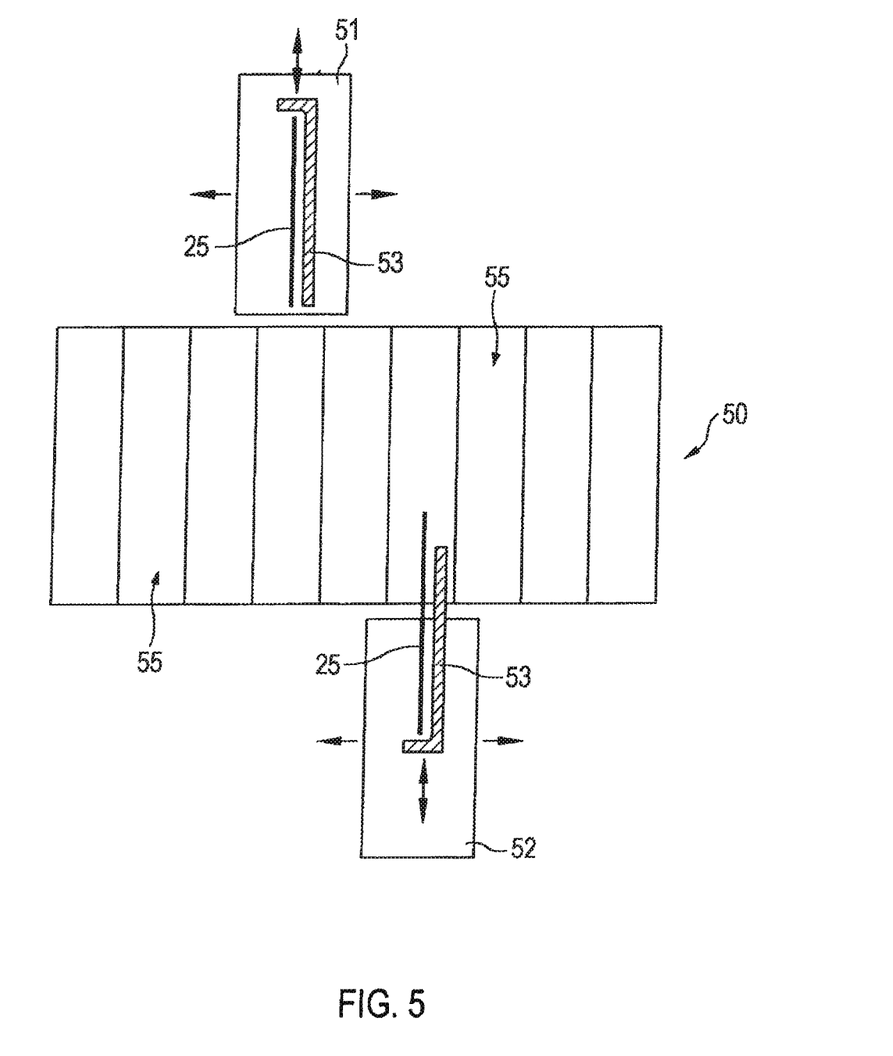
FIG. 5 shows schematically an exemplary embodiment of an intermediate storage unit of the inventive glass cutting device.

The function of the glass cutting optimisation, or of the system comprising control server and optimisation, consists not only in delivering the best possible proportions of waste but also in generating cutting sequences which permit optimum supply to the following processes with the aid of the dynamics of the sequencer. In the case of an insulation glass manufacturer this means, for example, that a float glass pane of 4 mm thickness does not need to wait excessively long in the intermediate buffer 50 for its coated counterpart. If the corresponding pane arrives and if the dispatch sequence, for example, is therefore also ensured, both panes 25 can then be automatically fed into the insulating glass line or a further intermediate buffer (compartmented truck). Furthermore, it is possible by means of the control server to temporarily store panes required at short notice in more favourable positions in the sequencer. Depending on the configuration of the sequencer, certain compartments may be reachable more quickly than others (travel paths, etc.). This is possible, as stated above, because the control server only calculates and implements the required storage positions practically at the moment of storage, on the basis of the current situation. With a suitably enlarged sequencer it is thereby also possible, depending on the following process, to delay output panes and thereby to achieve a real-time buffer for subsequent processes in the event of a possible failure of supply from the cutting operation. Likewise, in the event of failure or blockages in the following process, the control server can control the sequencer in such a way that more panes are stored than are needed, to prevent stoppage of the cutting plant in this case. A direct coupling of the cutting operation to subsequent processes with a variable, adjustable time buffer is thereby made possible.

With the usual daily mix of 5 to 6 regular types of glass suitable for optimisation, and innumerable special combinations, a cutting optimisation can only perform this task if it is able to synchronise the optimisations of the individual glass types in their temporal interaction. For the cutting of special glasses by hand the optimisation provides synchronised manual cutting lists. In addition, the procurement of glasses additionally required is organised. It may also be necessary, given a suitable quantity, to organise further corresponding control-server dependent cutting processes. Thus, it may be the case that a considerable quantity of laminated safety glasses (VSG) is required which must be provided using a technically completely different cutting process. With a suitable structure, a dependent control server (auxiliary process) is able to synchronise the VSG cutting process according to demand by suitable direct intervention in the VSG cutting plant and the displays thereof. In this way, the VSG panes procured at short notice in this manner, and the other special panes, can then be fed into the process in varying ways monitored by the control server:

Feeding in at the entrance of the sequencer: Here, the display at the breaking table, for example, is used to instruct the workman to place a pane from a waiting, pre-organised supply of special panes on the table instead of the next cut pane.

Feeding in through the sequencer: It is possible that a suitable compartmented truck with special glasses is docked to a device for automatic removal so that, under the control of the control server, the loading or unloading device of the sequencer can automatically feed in these panes or make them directly available at the exit.

Leaving free compartments in an output compartmented truck for later manual completion.

In addition, the real-time system has a suitable interface 75 to the operators. For this purpose, firstly, a breaking-diagram and information display for the workpeople at the breaking table is possible, which display communicates directly with the control server and on which, for example, information regarding the removal of panes which are not to be moved through the intermediate buffer, and information regarding the feeding in of panes from other sources, is displayed. Secondly, a display 75 is used to display the current status of the optimisations and of the output side of the dynamic intermediate buffer 50. On this display 75 the user can see at an early stage, for example, that a residual plate will be produced for one glass type if no other orders are made available. A colleague in the higher-level planning system can use this information to look for suitable orders and make them available for the system. Through this interaction it is possible to use the dynamics of the system even in the preparation of work.

To sum up, it can be stated that the method according to the invention leads to significantly improved proportions of cutting waste, renders complex and costly sorting equipment superfluous, considerably reduces the space requirement in the cutting and breaking areas, greatly shortens the transit times, ensures a secure supply to the following processes and indeed makes direct coupling to them possible for the first time, reacts flexibly to short-term obstructions, breakages and fast-tracked orders, greatly simplifies handling of remnants and replaces waste optimisation by a more far-reaching cost optimisation of the total process, in which the different cost prices of the glass types are taken into account and considerations of productivity and material utilisation are weighed against one another.

The invention claimed is:

1. A method for cutting raw glass slabs into a multiplicity of glass cuttings, comprising the steps:
   (a) determining a supply of uncut and partially cut raw glass slabs,
   (b) continuously detecting incoming new cutting orders in real-time,
   (c) continuously detecting processed cutting orders in real-time,
   (d) continuously determining an optimised processing sequence and optimised cutting patterns of raw glass slabs based on values determined in steps (a) to (c) in real-time,
   (e) processing the cutting orders of step (b) according to the determined optimised processing sequence and the optimised cutting patterns,
   (f) storing and buffering the glass cuttings in dynamically assigned compartments of an intermediate storage unit by means of a calculating device controlled as a function of the optimised processing sequence determined in step (d), and
   (g) sequenced removal of the glass cuttings from the intermediate storage unit, the compartments of the intermediate storage unit being charged with and emptied of glass cuttings simultaneously.

2. A method according to claim 1, whereby the optimised processing sequence is determined by a further-processing sequence needed for subsequent further processing of the glass cuttings.

3. A method according to claim 1, whereby the assigned compartment of the intermediate storage unit is selected in such a manner that travel paths required for insertion into and removal from the intermediate storage unit are minimised.

4. A method according to claim 1, whereby a plurality of different types of glass, which can be processed in a freely selectable sequence, are taken into account in the continuous determination of the optimised processing sequence in real-time and of the optimised cutting patterns of raw glass slabs in process step (d).

5. A method according to claim 1, further including detecting individual glass panes fed in or extracted manually.

6. A method according to claim 1, further including taking into account special express orders.

7. A method according to claim 1, including detecting damage to a raw glass slab or to a glass cutting during processing, and taking account the continuous determination of the optimised processing sequence and of the optimised cutting patterns of raw glass slabs in real-time in process step (d).

8. A method according to claim 1, including, if an interruption of processing occurs, detecting and determining results from process steps (a) to (d) and storing the results automatically.

9. A method according to claim 1, whereby the determination of the optimised processing sequence and of the optimised cutting patterns of raw glass slabs in process step (d) can be adjusted in favour of higher productivity in a form of glass cuttings processed per unit of time or in favour of minimised cutting waste.

10. A method according to claim 1, whereby the intermediate storage unit serves as a buffer store for further processing of the glass cuttings.

11. A method according to claim 1, whereby the intermediate storage unit serves as a buffer store for dispatch of the glass cuttings, and the glass cuttings are deposited in the compartments of the buffer store in a sequence planned for dispatch.

12. A method according to claim 11, whereby the dispatch sequence of the glass cuttings is predetermined by a further-processing plant which is being supplied.

13. A method according to claim 1, whereby a current processing status of the method, including any damage to raw glass slabs or to glass cuttings, is displayed on a display device.

14. A method according to claim 1, whereby process step (f) includes notching of the raw glass slabs and subsequent breaking on a breaking table.

15. A method according to claim 1, whereby process step (f) includes cutting of the raw glass slabs by means of laser or water-jet tools.

16. A device for cutting raw glass slabs into a multiplicity of glass cuttings, comprising:
　a raw glass slab storage unit for storing uncut and partially cut raw glass slabs,
　a determination device for determining a supply of uncut and partially cut raw glass slabs and for continuously detecting incoming new cutting orders and processed cutting orders in real-time,
　a calculating device for continuously determining an optimised processing sequence and optimised cutting patterns of raw glass slabs based on values determined by the determination device in real-time,
　a processing device for cutting the raw glass slabs into the glass cuttings,
　a control device for controlling the processing device according to the determined optimised processing sequence and the optimised cutting patterns, and
　an intermediate storage unit with a plurality of compartments for dynamic storing and buffering, controlled by a calculating device, of processed glass cuttings as a function of the optimised processing sequence, the compartments of the intermediate storage unit being configured to be charged with and emptied of glass cuttings simultaneously.

17. A device according to claim 16, whereby the calculating device is configured to determine the optimised processing sequence while taking into account a further processing sequence needed for further processing of the glass cuttings.

18. A device according to claim 16, including an insertion device for inserting individual glass panes which are fed in or extracted manually.

19. A device according to claim 18, whereby the insertion device is configured for determining special express orders.

20. A device according to claim 16, including a monitoring device for detecting damage to a raw glass slab or to a glass cutting during processing.

21. A device according to claim 20, whereby the calculating device is configured to take into account damage, detected by the monitoring device, to a raw glass slab or to a glass cutting, when continuously determining the optimised processing sequence and the optimised cutting patterns of raw glass slabs in real-time.

22. A device according to claim 16, whereby the intermediate storage unit is configured as a compartmented truck with a multiplicity of compartments for vertically storing the glass cuttings.

23. A device according to claim 16, whereby the intermediate storage unit comprises two magazines, which are displaceable with respect to one another, with compartments for vertically storing the glass cuttings.

24. A device according to claim 16, whereby the intermediate storage unit has a fixed magazine with compartments for vertically storing the glass cuttings, and loading and removal devices which are displaceable independently of one another.

25. A device according to claim 16, including a display device for displaying a current processing status of the glass cuttings.

26. A device according to claim 16, including a device for notching the raw glass slabs and a breaking table for subsequently breaking the notched raw glass slabs.

27. A device according to claim 16, including a cutting device for cutting the raw glass slabs by means of laser or water jet.

* * * * *

UNITED STATES PATENT AND TRADEMARK OFFICE
CERTIFICATE OF CORRECTION

PATENT NO. : 8,655,477 B2  
APPLICATION NO. : 12/377449  
DATED : February 18, 2014  
INVENTOR(S) : Bernd Wirsam et al.

Page 1 of 1

It is certified that error appears in the above-identified patent and that said Letters Patent is hereby corrected as shown below:

In the Specification
In column 6, line 52, replace "inter alis" with --inter alia--.

Signed and Sealed this
First Day of March, 2016

Michelle K. Lee
*Director of the United States Patent and Trademark Office*